No. 731,461.

Patented June 23, 1903.

UNITED STATES PATENT OFFICE.

ALFRED KING JARECKI, OF SANDUSKY, OHIO.

PROCESS OF PRODUCING FERTILIZERS.

SPECIFICATION forming part of Letters Patent No. 731,461, dated June 23, 1903.

Application filed December 8, 1902. Serial No. 134,300. (No specimens.)

*To all whom it may concern:*

Be it known that I, ALFRED KING JARECKI, a citizen of the United States, residing at Sandusky, in the county of Erie and State of Ohio, have invented certain new and useful Improvements in Processes of Producing Fertilizers, of which the following is a specification.

My invention relates to a new process of forming a fertilizer material, the essential idea of which consists in the utilization of the evaporated slop known as "vinasse," which is a waste beet-sugar syrup constituting one of the by-products of alcohol-work. This syrup contains both nitrogen and potash, and the only available use therefor in the arts heretofore consisted in the combustion thereof to reclaim the potash. This slop comes from beet-sugar works in thick condition and is then diluted before fermentation and after alcohol is distilled off is concentrated to expel surplus water.

In my process the slop is taken as it comes from the alcohol-works, which is about the proper consistency. The syrup as coming from sugar-works is unsuitable for use in my or any other fertilizer on account of large contents of sugar, (fifty per cent.,) which also makes it too costly. When boiled down, this syrup in its physical characteristic is a heterogeneous, viscous, thick, syrupy compound.

Heretofore in fertilizer processes in order to provide for the nitrogenous and potassium elements used in my new process it was necessary to use waste animal matter and animal refuse, also to provide a potassium element, such as the carbonate, sulfate, or muriate of potassium. These compounds are considerably more expensive than the waste beet-sugar-alcohol slop I use.

My process is as follows: In a suitable vessel, preferably an ordinary iron fertilizer-mixer, I place a basic phosphate, such as commercial phosphate rock. The proportions I have found most effective are as follows: To forty parts of this phosphate rock I add about forty parts of sulfuric acid. In the resulting reaction the phosphate is decomposed and recombined to form acid phosphates and sulfates of lime. I then add about twenty parts of the waste syrup and thoroughly mix with the water already in the retort. A new chemical action occurs, the organic matter is decomposed by the sulfuric acid, and the nitrogen and potassium of the syrup enter into new combinations with the excess of sulfuric acid and the acid phosphates and sulfates of lime. At the same time the heat generated by the chemical reaction destroys the saccharine and viscous matter of the syrup and drives off the excess of moisture. The contents of the retort can then be dumped in heaps and the reactions continue for some time, the final result of which is a product which can be pulverized and bagged and, in short, used as an ordinary granular commercial phosphate. Preferably in order to make provision for the absorption of any excess of organic acid resulting from the reaction on the syrup I introduce into the mixture of the phosphate base and the sulfuric acid either before, after, or at the time of the introduction of the syrup from ten to fifteen parts of organic waste, such as garbage or animal tankage, peat, tobacco-stems, cotton-seed hulls, or other organic refuse. This utilizes another waste product and insures the provision of a fertilizer of requisite physical body, as well as adding efficiency by incorporating its own contained fertilizing elements. An inorganic absorbent might be employed, though less desirable on account of the cost.

The proportions from which I have obtained the best results are as follows: basic phosphate, thirty-five per cent.; forty-three to fifty per cent. of sulfuric acid, eighteen per cent. of syrup, and four per cent. of tankage or organic refuse. This mix produces a dry granular product containing one per cent. of nitrogen, ten to twelve per cent. of phosphoric acid, and 1.6 per cent. of potash. This product is stable and admirably adapted to be commercially handled and shipped.

It will be noted that the percentage of the animal tankage constituting the absorbent element is very small, showing that but little absorbent is needed. It is preferred to use it, however, to increase the bulk of the product and because it contains a small percentage of ammonia. If I dispense with the use of the absorbent, I increase the percentage of phosphate rock, using, preferably, something like the following proportions: sixteen per cent. of slop, forty per cent. of phosphate rock, and forty-four to fifty per cent. of sulfuric acid.

The product resulting from this process is also a dry granular fertilizer adapted to be commercially handled.

The heat produced by the chemical reactions drives off the excess of moisture and the product can be crumbled between the fingers and gives off a slightly-pungent odor.

I do not limit myself to the exact proportions used, as they may be considerably varied.

Having described my invention, I claim—

1. The herein-described process of producing a fertilizer consisting in the treatment of a basic phosphate with sulfuric acid, thoroughly mixing therewith a waste beet-sugar-alcohol slop containing nitrogen, and allowing the mixture to stand until the heat produced by the reactions drives off the excess of moisture, leaving a dry, granular product, substantially as described.

2. The herein-described process of producing a fertilizer consisting in the treatment of a basic phosphate with sulfuric acid, mixing therewith a waste beet-sugar-alcohol slop containing nitrogen and potash and an absorbent, and allowing the mixture to stand until the heat produced by the reactions drives off the moisture, leaving a dry, granular product, substantially as described.

3. The herein-described process of producing a fertilizer, in the treatment of basic phosphate with sulfuric acid, mixing therewith a waste beet-sugar syrup and an absorbent, composed of organic refuse, containing ammonium and allowing the mixture to stand until the moisture has been driven off, and a dry granular fertilizer remains, substantially as described.

In testimony whereof I have hereunto set my hand.

ALFRED KING JARECKI.

Witnesses:
JAMES M. FRENCH,
ALMA M. BROD.